Figure 1:
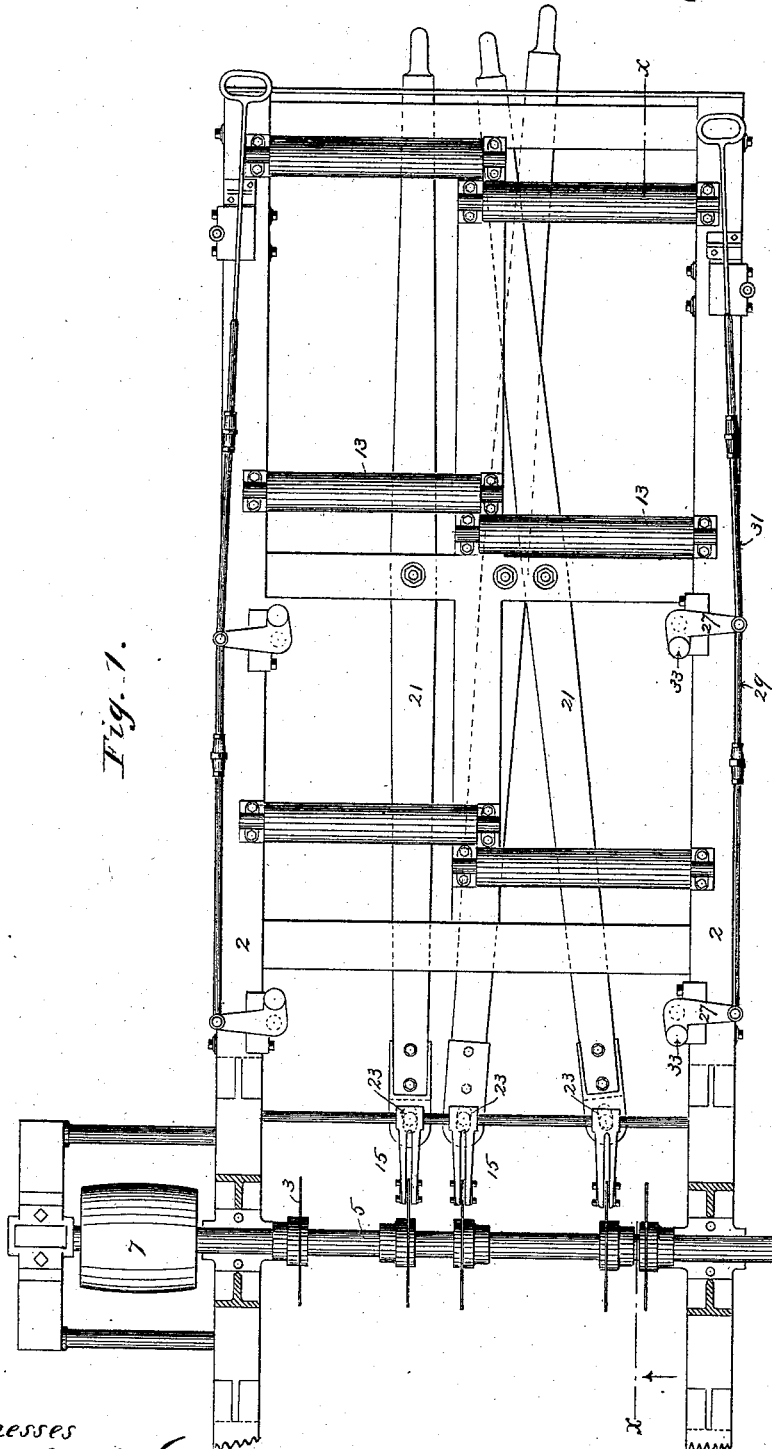

(No Model.) 2 Sheets—Sheet 1.

W. F. PARISH.
GANG EDGER.

No. 369,025. Patented Aug. 30, 1887.

Witnesses
R. H. Sanford
A. C. Paul

Inventor
William F. Parish (No Model.) 2 Sheets—Sheet 2.
W. F. PARISH.
GANG EDGER.
No. 369,025. Patented Aug. 30, 1887.
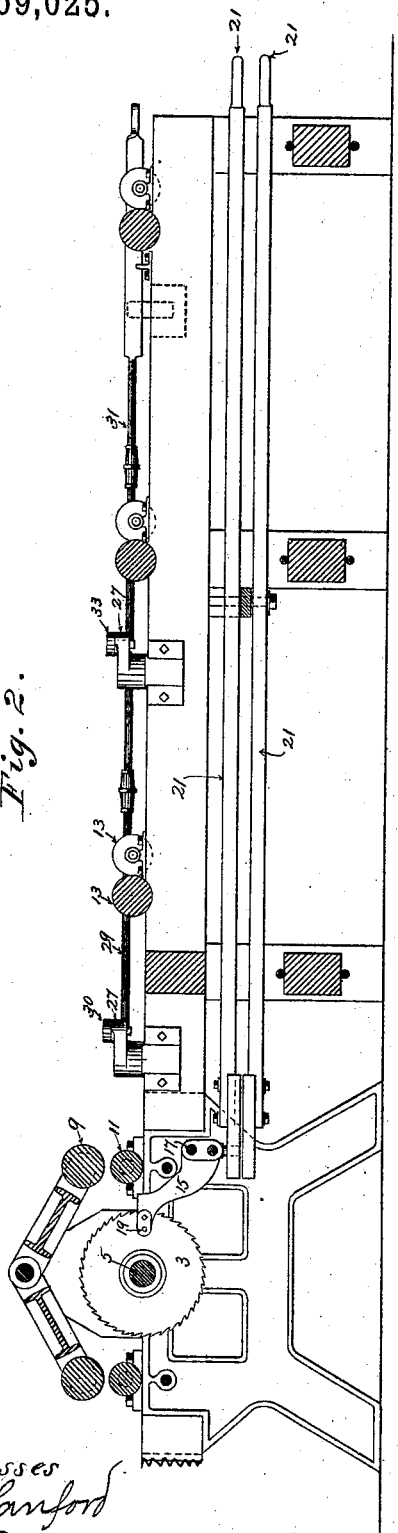

UNITED STATES PATENT OFFICE.

WILLIAM F. PARISH, OF MINNEAPOLIS, MINNESOTA.

GANG-EDGER.

SPECIFICATION forming part of Letters Patent No. 369,025, dated August 30, 1887.

Application filed June 1, 1886. Serial No. 203,697. (No model.)

*To all whom it may concern:*

Be it known that I, WILLIAM F. PARISH, of Minneapolis, in the county of Hennepin and State of Minnesota, have invented certain Improvements in Gang-Edgers, of which the following is a specification.

This invention relates to improvements in that class of machines in which a number of circular saws are mounted on a common mandrel and are relatively adjustable as to the distance between them, for the purpose of cutting up wide planks, boards, &c., into boards or scantling of any desired width.

The objects of this invention are to provide an improved means for quickly and accurately adjusting the saws toward or from each other on the mandrel, and also to provide adjustable guiding-rolls that operate in connection with fixed saws near the ends of the mandrel, for the purpose of cutting the material into narrow strips.

In the accompanying drawings, forming part of this specification, Figure 1 is a plan of a portion of a gang-edger embodying my invention, the feed-rolls being omitted to more clearly show the mechanism for adjusting the saws. Fig. 2 is a longitudinal vertical section on line *x x* in Fig. 1, looking in the direction of the arrow. Figs. 3 and 4 are details of one of the sliding yokes by which the saws are moved.

In the drawings, 2 represents the frame of the machine; 3, the saws, mounted on an arbor, 5, to which power is applied through the driving-pulley 7. These parts may all be of any suitable construction. The machine is also provided with the usual feed-rolls, 9 11, which are driven by any suitable means, and the idler-rolls 13, over which the material is pushed by hand to the rolls 9 and 11. A part or all of the saws 3 are mounted so as to turn with the arbor 5, but are free to slide longitudinally thereon.

A yoke or guide, 15, is arranged in connection with each of the movable saws. These yokes are mounted and slide freely on rods or bars 17, that are located below the feed-rolls and are parallel with the saw-arbor. The movable saws each project between the two parts of the yoke, as shown in Figs. 1 and 2. Pins 19 are provided in the yoke to bear against the opposite faces of the saws. These yokes serve a double purpose. They are the means by which the saws are moved and held at any point on the arbor, and they also engage the opposite faces of each saw at a point near its edge and just below its cutting portion, thereby serving as guides and steadying the saws while they are cutting. The yokes are preferably constructed, as shown in Fig. 2, with sharp edges at the top and with the space between the two parts increasing in width from the top toward the bottom. By the sharp upper edges of the yokes any slivers or splinters that come against them are broken, and the shape of the opening permits any refuse material that gets into it to drop out at the bottom. I prefer to form the yoke integrally of cast metal, with a tie between the two parts, as indicated by dotted lines in Fig. 3.

Pivoted in the frame of the machine are a series of operating-levers, 21, one for each movable saw. These levers extend to the end of the machine, where they are provided with suitable locking mechanism and a gage by which the relative positions of the saws may be determined. The opposite ends of the levers are connected with the yokes 15 by suitable means. As shown in the drawings, the ends of the levers are provided with slots 23, into which extend lugs or projections 25 on the yoke. The levers swing in horizontal planes, and as the handle end of any lever is moved in one direction the saw with which the lever is connected moves in the opposite direction. As the yoke slides on a support that is parallel with the saw-arbor, the saws are moved without twisting or straining them, as would be done were the yokes carried directly by the levers.

The longer arms of the levers are preferably between the fulcrums and the yokes, so that the saws may be very quickly adjusted. The handle ends of the levers being arranged at the end of the machine, the attendant can adjust the saws without moving from the position in which he stands to feed the material to the machine.

In Fig. 3 I have shown an enlarged detail view of one of the yokes. I have here shown the yoke adapted to a single rectangular supporting-bar. This form of bar may be used as an equivalent for the two bars shown in Fig. 2; or two rectangular bars may be used, if preferred, for the same purpose.

I prefer to arrange at least one of the levers in a plane below the others, so that each lever may have a considerable throw without interfering with the others.

The saws nearest the ends of the arbor are preferably stationary, and I prefer to provide the machine with a series of adjustable guide-rolls, which may be used in connection with the fixed saws for cutting the material into narrow strips.

Upon the frame 2 I mount, preferably at each side thereof, two or more bell-crank levers, 27. These levers turn upon vertical pivots and are arranged below the upper surface of the rolls 11 13. The levers are connected by rods, and an operating-rod, 31, extends to the end of the machine. Upon an arm of each lever is a guide-roll, 33, mounted on a vertical pivot and extending above the upper surface of the rolls 13. These rolls 33 are in line with each other. By moving the rod 31 the rolls 33 are together moved in or out toward or away from the plane of the fixed saw.

By holding one edge of a plank or board against the rolls 33 and moving it through the machine, a strip will be cut therefrom equal in width to the distance from the rolls 33 to the line of the fixed saw, and this distance may be determined by adjusting the rolls as described.

I claim as my invention—

The combination, in a machine of the class described, with the saw and feed-rolls, of the bell-crank lever swinging in a horizontal plane, the rods 29, connecting said levers, the operating-rod 31, and the guide-rolls 33, mounted upon vertical pivots upon the bell-crank levers, substantially as and for the purpose set forth.

In testimony whereof I have hereunto set my hand this 27th day of May, 1886.

WILLIAM F. PARISH.

In presence of—
R. H. SANFORD,
A. C. PAUL.